United States Patent [19]

Kalberer

[11] 3,908,299
[45] Sept. 30, 1975

[54] LINE DEPRESSOR
[76] Inventor: Karl H. Kalberer, 85 Somerset Dr., Santa Rosa, Calif. 95401
[22] Filed: Oct. 11, 1974
[21] Appl. No.: 514,327

[52] U.S. Cl. ............................................. 43/43.13
[51] Int. Cl.² ........................................ A01K 95/00
[58] Field of Search ............ 43/43.13, 42.04, 42.72, 43/42.49

[56] References Cited
UNITED STATES PATENTS

| | | | |
|---|---|---|---|
| 2,220,302 | 11/1940 | Thorns | 43/43.13 |
| 3,570,167 | 3/1971 | Smith | 43/43.13 |
| 3,667,148 | 6/1972 | Dawson | 43/43.13 |

Primary Examiner—Warner H. Camp
Attorney, Agent, or Firm—George B. White

[57] ABSTRACT

The line depressor herein is for submerging trolling lines until a predetermined increased tension on the line shifts the point of pull in such a way that the depressor assumes an attitude in registry with the line of pull and thereby reduces resistance to the pulling of the line out of the water. Conversely, when the line depressor is in the water and is being held substantially in registry with the rod line and the hook line, it is only necessary to allow the rod line to go slack to cause the body to assume its trolling attitude and depress the line. The line depressor includes a body having at least one hydrodynamically depressing surface, and having a weighted rod end and a hook end; a curved guide is extended from the front rod end of said body upwardly and rearwardly with respect thereto; a resiliently expandable line is connected at one end thereof to the rod line and at its other end it is slidable on the curved guide between front and rear positions; an initially slack trip-line is connected at one end to the rod line and at its other end to said body in such a manner that when a predetermined force is exerted on the rod line, the expandable line pulls the trip line taut; the trip line pulls up the front end of the body causing the slidable end of the expandable line to slide to its front position on the guide and thereby simultaneously pulling the body into aligned position.

14 Claims, 8 Drawing Figures

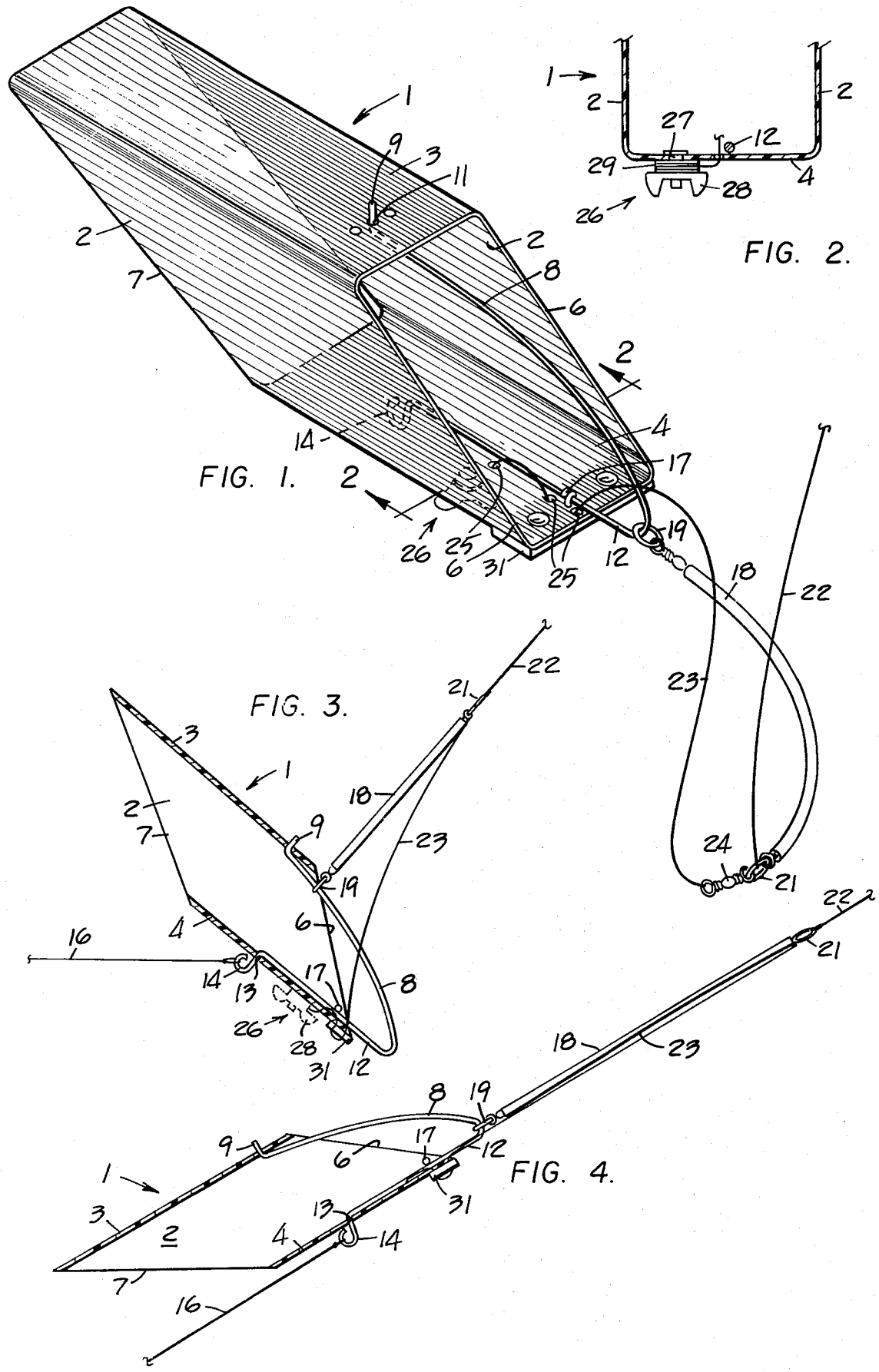

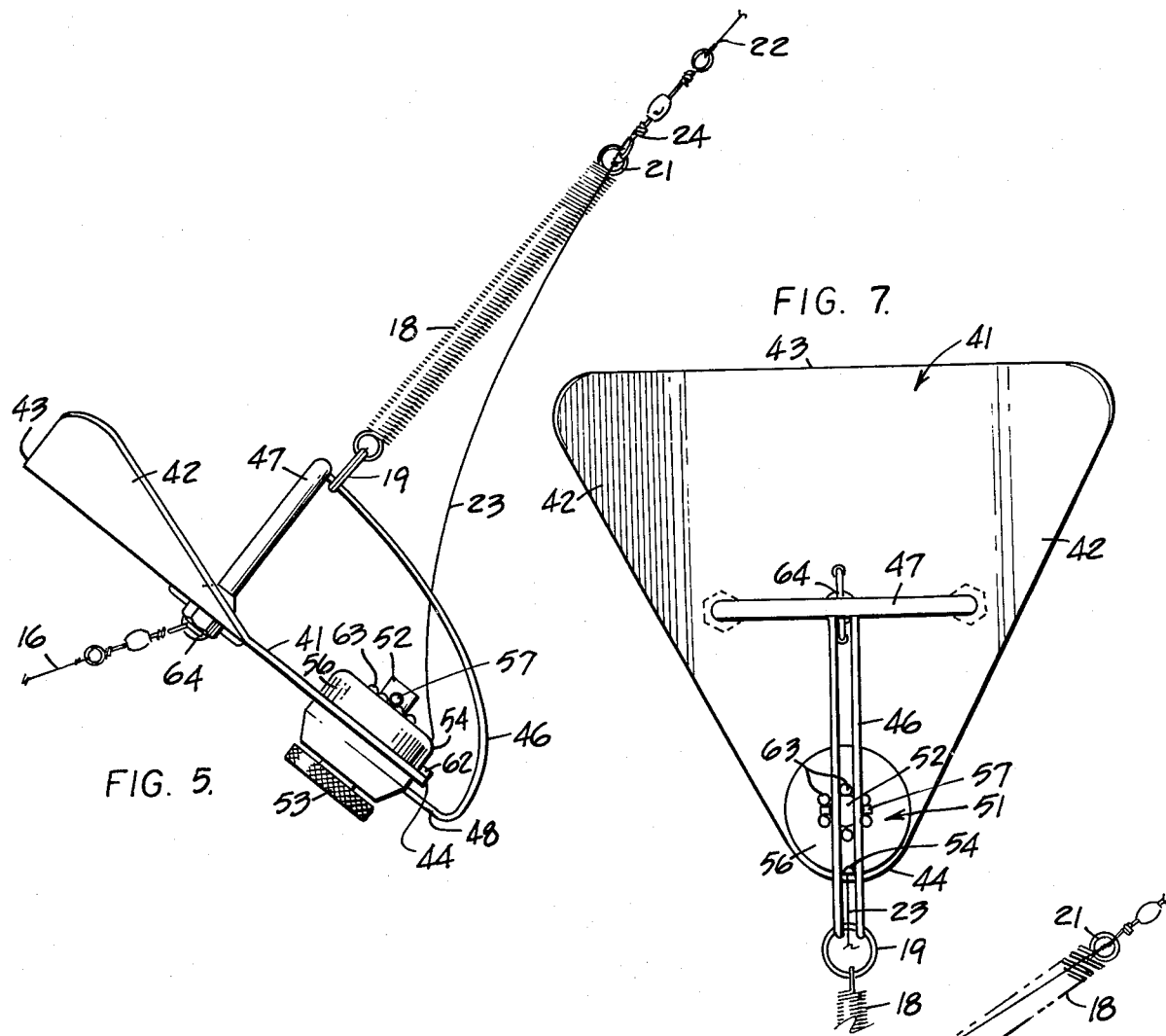
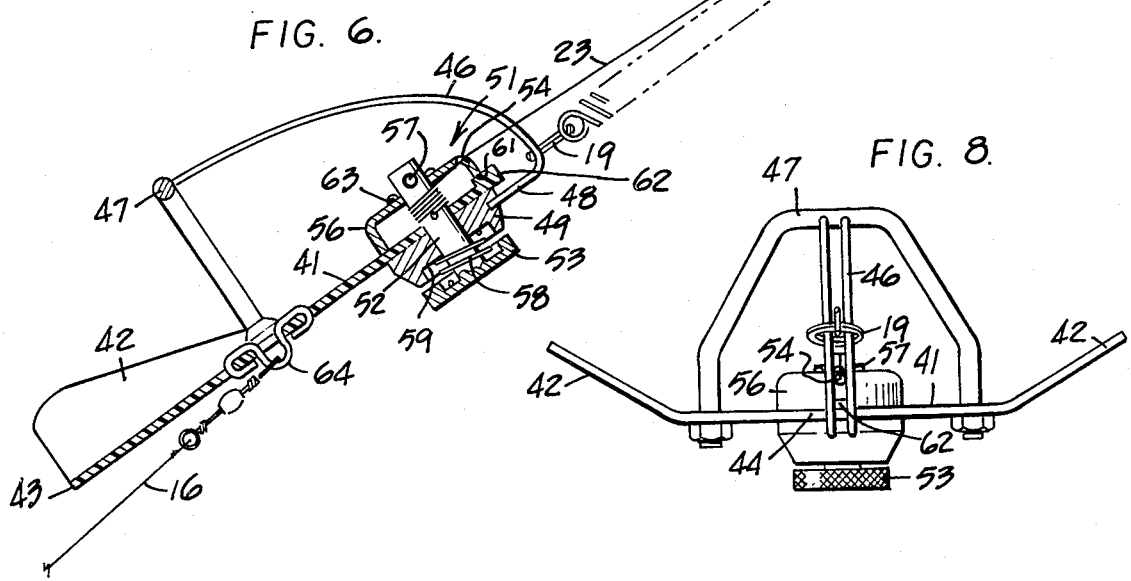

LINE DEPRESSOR

BACKGROUND OF THE INVENTION

Various attempts have been made for shifting the pulling point on depressors, each involving certain devices in which a part had to be released or in which undue vibration or side to side movement were caused by the change of the point of pull. Applicant is aware of U.S. Pat. No. 3,583,089, in which a pin is pulled out of the body for shifting the point of pull under tension; also U.S. Pat. No. 3,466,787 which shows a bifurcated guide working on a plain sheet but relies on shifting of loose weights; also an attempt was made to provide an additional line in U.S. Pat. No. 2,512,262 for a different purpose than applicant's limit or trip-line.

It is the primary object of the invention to provide a water-foil body which when in line with the rod-line and the hook-line under tension provides minimum resistance to reeling in the line, but which under a yieldable predetermined tension in the water assumes an attitude whereby it depresses the line to greater depth in the water and thereby facilitates deep trolling, and which is capable of reacting instantaneously to increased tension caused by pulling more forcefully on the rod line or by a fish on the hook to turn the body into aligned position thereby facilitating instantaneous manipulation of the line for reeling in the line or for pulling the fish out of the water.

BRIEF DESCRIPTION OF THE FIGURES

FIG. 1 is a perspective view of the line depressor having a tubular water-foil body.

FIG. 2 is a fragmental sectional view showing the trip-line adjusting device on said line depressor.

FIG. 3 is a longitudinal sectional view of the said line depressor in trolling attitude.

FIG. 4 is a cross-sectional view of said line depressor in aligned attitude.

FIG. 5 is a perspective view of a modified form of the line depressor in trolling attitude.

FIG. 6 is a perspective view of the modified form in aligned attitude.

FIG. 7 is a top plan view of the modified form.

FIG. 8 is a front view of the modified embodiment.

DETAILED DESCRIPTION

In the form shown in FIGS. 1 to 4 the line depressor body is a body 1 which is closed on all sides. Spaced elongated side walls 2 are connected at their longitudinal edges by a longitudinal top 3 and bottom 4. The sides 2 have inclined edges 6 at the rod end of the body slanting toward the end of the bottom 4 and outwardly of the body, and have inclined edges 7 at the hook end of the body 1 inclined toward the hook end of the bottom 4 and inwardly of the body 1.

In the rod end of the body 1 is a curved guide 8, the end 9 of which is hooked in one of three holes 11 in the top 3. When guide end 9 is hooked through a hole 11 other than the center hole, it will cause the depressor to troll to the side toward which the guide end was moved. This is useful in trolling to either side of the boat's wake. The guide 8 curves toward the plane of the bottom 4 and projects beyond the rod end of the bottom 4 where it turns back into the body 1 in a straight portion 12. The inner end of the straight portion 12 is bent and is inserted through a hole 13 in the bottom 4, and terminates in an eye hook 14 to which the trolling or hook-line 16 is suitably secured. The straight portion 12 is also anchored in an eye 17 on the inside and near the rod end of the bottom 4.

A longitudinally resiliently expandable member such as an elastic line 18 has a ring 19 on one end thereof slidable on the curved guide 8. To the ring 21 on the other end of the elastic line 18 is suitably connected a rod-line 22 extending from the usual rod and reel not shown.

A trip-line 23 is connected by a suitable swivel connection 24 to the ring 21. The trip-line 23 is threaded through holes 25 to an adjusting anchor 26. This anchor 26 includes a bolt 27 extended through the bottom 4 near the innermost hole 25. On the bolt 27 is a wing nut 28. The end of the trip-line 23 is anchored on and is wound around a drum 29 on the wing nut 28. The trip-line 23 is longer than the elastic line 18 so that the latter must be expanded before the trip-line 23 is pulled taut and trips the body 1 upwardly into the position shown on FIG. 4. A weight 31 such as a metal plate is secured to the underside of the bottom 4 at the rod end thereof so as to bias the tubular body 1 downwardly into the water.

In operation in the initial position shown in FIG. 3 the water-foil surfaces formed by the slanting sides 2 and top 3 and bottom 4 and the weight 31 cause the body 1 to tip its rod end downwardly into the water, whereby the ring 19 of the elastic line 18 slides on the curved guide 8 to the top 3. When a fish is caught on the trolling line 16 or a more forcefull pull is exerted on the rod line, the pull exerted by the rod-line 22 elongates the elastic line 18 until the trip-line 23 becomes taut, and trips the rod end of the tubular body 1 upwardly, thereby causing the ring 19 to slide on the curved guide 8 toward the bottom 4 to the turn at the straight portion 12. Thus the stretched elastic line 18 and the trip-line 23 are parallel and the tubular body 1 is in line between the rod-line 22 and the hook-line 16, diminishing the resistance to reeling in the rod-line 22.

In FIGS. 5 through 8 inclusive a form of the line depressor is illustrated with a body 41 of a single piece which together with the upwardly turned wings 42 at each corner near the trailing edge 43 forms a single hydrodynamic surface. The body 41 is generally triangular an apex 44 of which opposite the trailing edge 43 forms the leading end of the body. The curved guide 46 extends from the leading end 44 upwardly and toward the trailing end over the body. The upper end of the curved guide 46 is secured to a cross-loop 47 the legs of which are fixedly secured to the body 41. In this position the curved guide 46 is substantially on the center line of the triangular body 41. The leading end of the curved guide 46 is turned back toward the body and is formed into a straight portion 48 which is anchored in a weight 49 particularly shown in FIG. 6. The weight 49 is on the underface of the leading portion of apex 44 of the body 41.

The elastic line 18 has one end slidably connected to the curved guide 46 by the ring 19 and has its other end connected by a suitable ring 21 to the rod line 22 as heretofore described in connection with the first form. The trip line 23 is connected at one end to the ring 21 by a connector 24 and the other end of the trip line 23 is connected to an anchor 51. The anchor 51 is adapted to adjust the length of the trip line 23. In this form the anchor is a pin 52 with a head 53 on the lower end thereof. The end of the trip line 23 is wound around the pin 52. The trip line 23 extends through a hole 54 in a cap 56 which encircles the upper end of the pin 52 and encases the wound end of the trip line 23. A cross-pin 57 extends through the free end of the pin 52 above the cap 56. A coil spring 58 between the head 53 and the bottom of a socket 59 in the weight 49 bears against the head 53 and pushes it outwardly thereby to press the cross-pin 57 against the cap 56 and hold the pin 52 against rotation. The cap 56 has a recess 61 at its bottom edge which is nested on a projection 62 on the apex 44 of the body to prevent the turning of the cap 56. On the top of the cap 56 are a plurality of spaced bumps 63 which prevent accidental rotation of the pin 52 under the pull of the trip line 23. In order to adjust the slackness of the trip line 23 the head is pushed in against the action of the spring 58 so that the cross-pin 57 clears the bumps 63 and then it is turned to the desired extent and when released the pin 52 remains in the adjusted position.

The hook line 16 can be connected to a loop 64 extended downwardly from the body 41.

In operation the hydrodynamic surface formed by the body 41 and wings 42 has a downward bias toward the leading end or apex 44 of the body. In this downward attitude there is assistance by the weight 49. During normal trolling the line depressor assumes the attitude shown in FIG. 5 and when the pull is increased so as to stretch the elastic line 18 sufficiently to pull the trip line 23 taut then the apex portion 44 of the body is pulled upwardly and the line depressor body assumes an attitude parallel with the rod line 22 as shown in FIG. 6.

I claim:

1. In a fishing line depressor,
   a body having a weighted front rod end and a rear hook end, respectively closer to the fishing rod and to the hook-line portion of the fishing line,
   at least one hydrodynamic surface on said body
   a curved guide extended from the front rod end of said body upwardly and rearwardly with respect thereto,
   a longitudinally and resiliently expandable line having one end thereof slidable on said curve guide between front and rear positions,
   a rod-line portion of the fishing line connected to the other end of said expandable line,
   a trip-line connected at one end to said body remote from said one end of said expandable line and at its other end to said rod-line, said trip-line being longer than said expandable line so as to be initially slack when said expandable line is in the rear position on said guide and is stretched to a sufficient length when a predetermined force is exerted thereon to pull said trip-line taut thereby causing said expandable line to slide to its front position and thereby tripping said body with said hydrodynamic surface substantially parallel with said rod line, thereby diminishing resistance to pulling the line out of the water.

2. The fishing line depressor specified in claim 1, and said hydrodynamic surface on said body being formed to normally bias said body at a downward angle toward the front rod end in the water.

3. The fishing line depressor specified in claim 1, and
   spaced parallel sides and a top and a bottom forming said body, in a tubular shape,
   each of said parallel sides having inclined edges thereof inclining toward said bottom and toward the front rod end of the tubular body.

4. The fishing line depressor specified in claim 1, and
   anchor means on said body for connection of said one end of said trip-line,
   and means related to said anchor means for adjusting the effective length of said trip line.

5. The fishing line depressor specified in claim 1, and
   means to connect said other end of said trip-line to said rod-line so as to be pulled taut when said expandable line is stretched by pull on said rod-line.

6. The fishing line depressor specified in claim 5, and
   the slidable end of said expandable line being a ring slidable on said curved guide.

7. The fishing line depressor specified in claim 1, and
   a weight element near the rod end of said body to assist in biasing said body normally downwardly into the water.

8. The fishing line depressor specified in claim 1, and
   parallel sides on said body,
   a top wall connecting the top edges of said sides,
   a bottom wall connecting the bottom edges of said sides,
   the end edges of the sides being inclined from the top wall toward the bottom wall and toward the front rod end of the body,
   said curved guide extending outwardly beyond the front rod end of said body and of said bottom wall,
   the slidable end of said expandable line sliding from the top wall toward the bottom wall on said curved guide when said expandable line is stretched to a predetermined length.

9. The fishing line depressor specified in claim 8, and
   a weight element on the front rod end of said bottom wall.

10. The fishing line depressor specified in claim 1, and
    means to adjust said curved guide into a selected angle relatively to said hydrodynamic surface.

11. The fishing line depressor specified in claim 1 and said hydro-dynamic surface on said body being formed by a plane surface and an upwardly extended wing along each side of said surface near to a trailing end of said body.

12. The fishing line depressor specified in claim 11 and said surface being triangular and said wings being near the base of said triangle,
    and a weight element at the apex of said triangle.

13. The fishing line depressor specified in claim 12, and
    anchor means at said weight adjustably anchoring the adjacent end of said trip line.

14. The fishing line depressor specified in claim 13 and
    said curved guide being anchored in said weight at its lower end, and
    means on said body to anchor the upper end of said curved guide spaced above said body.

* * * * *